Patented June 3, 1930

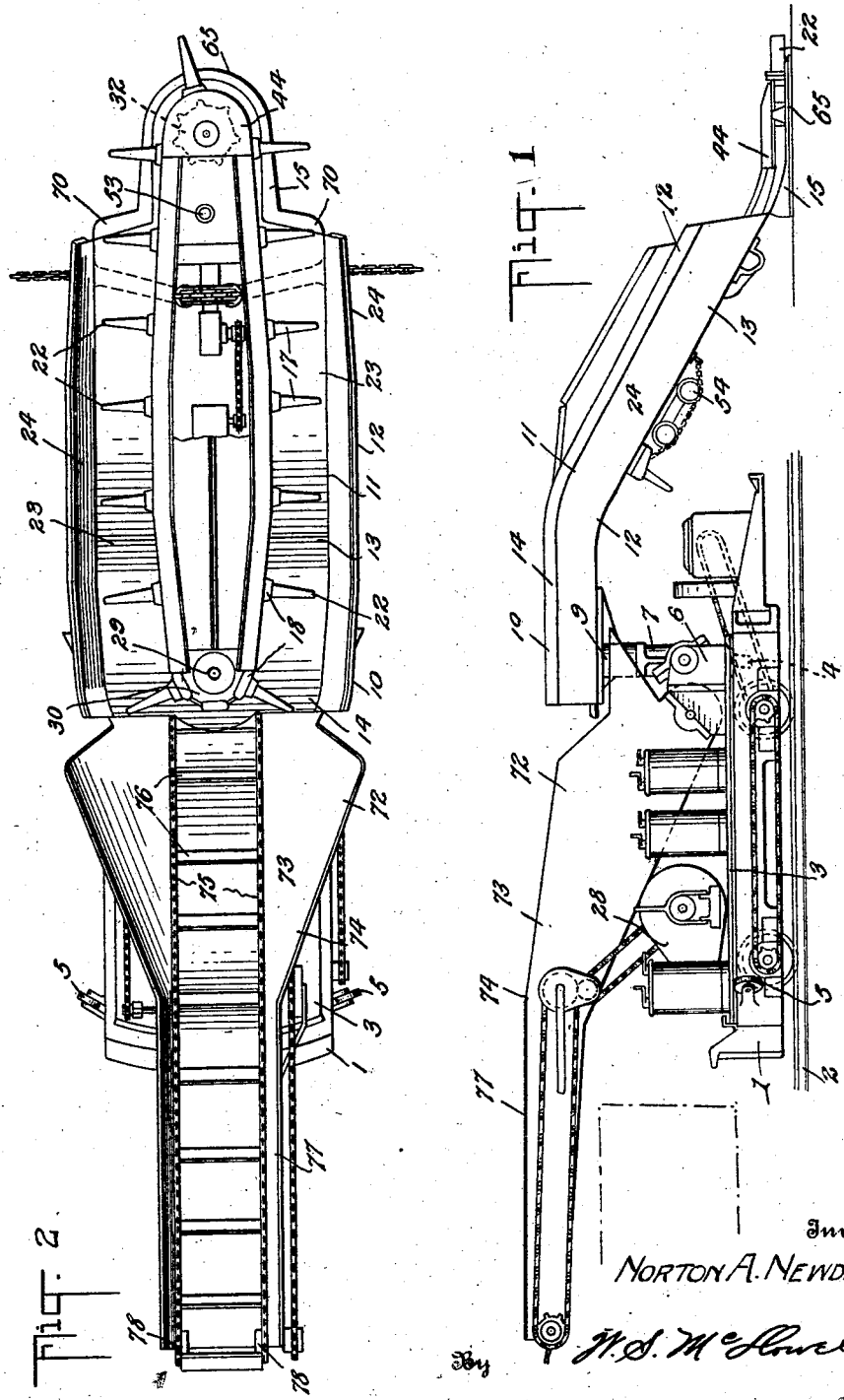

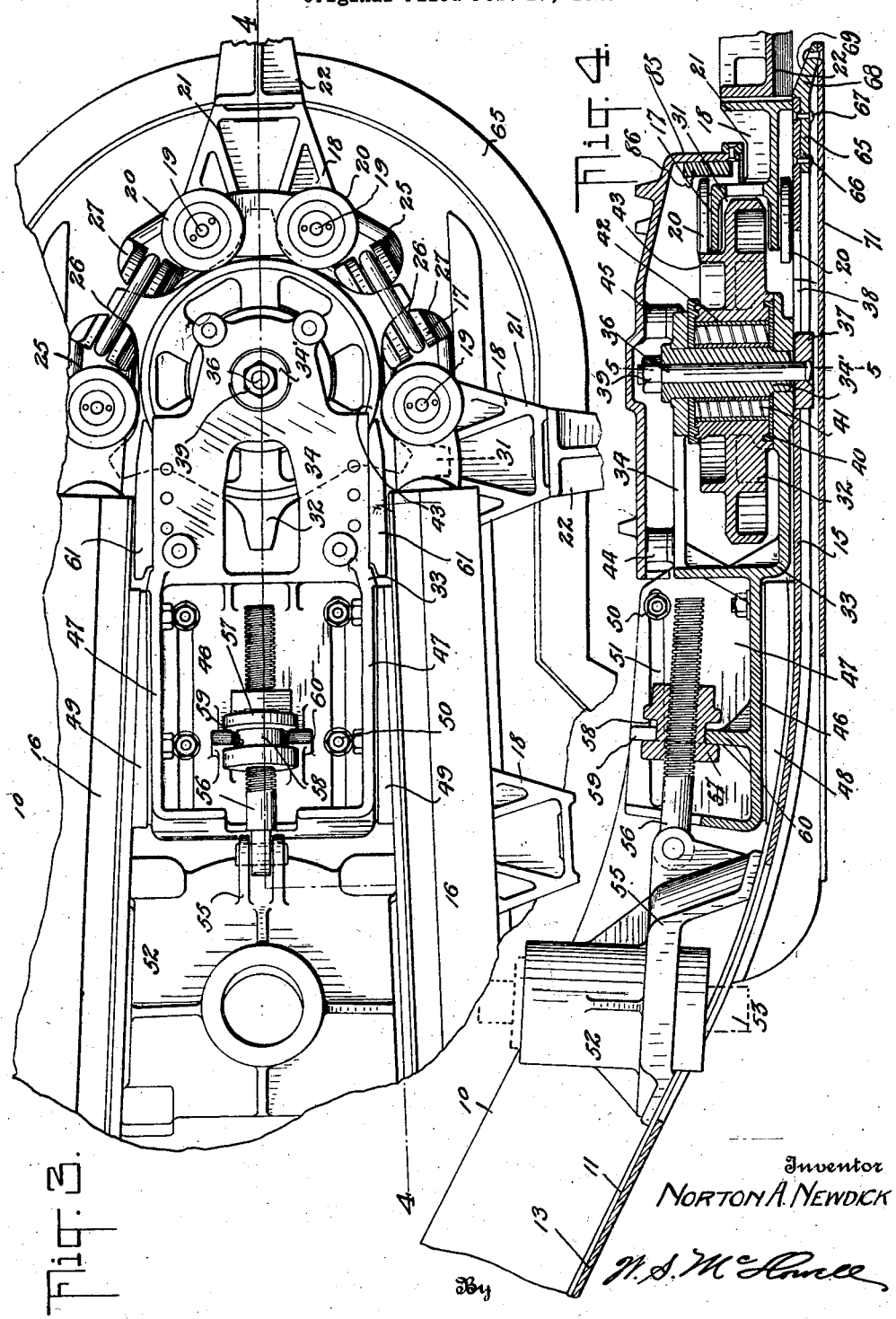

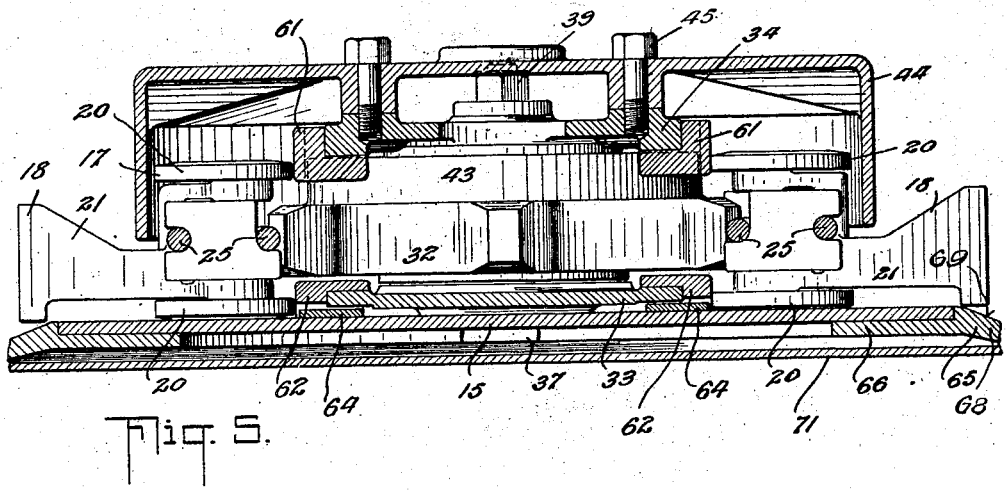
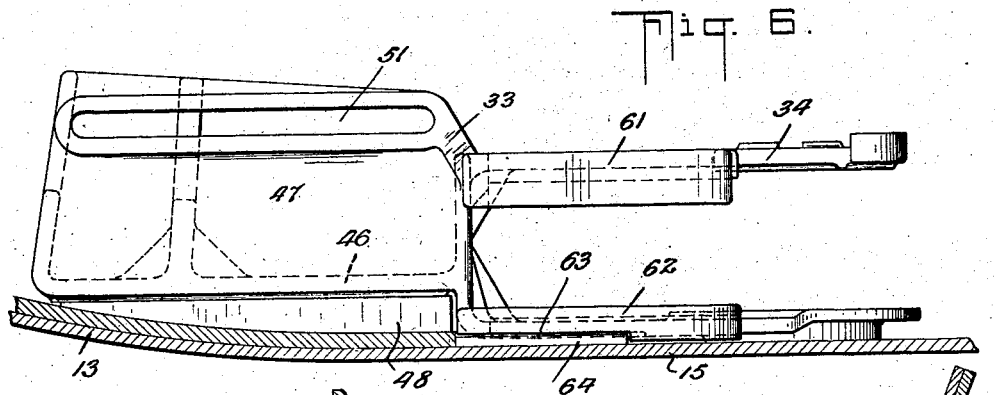
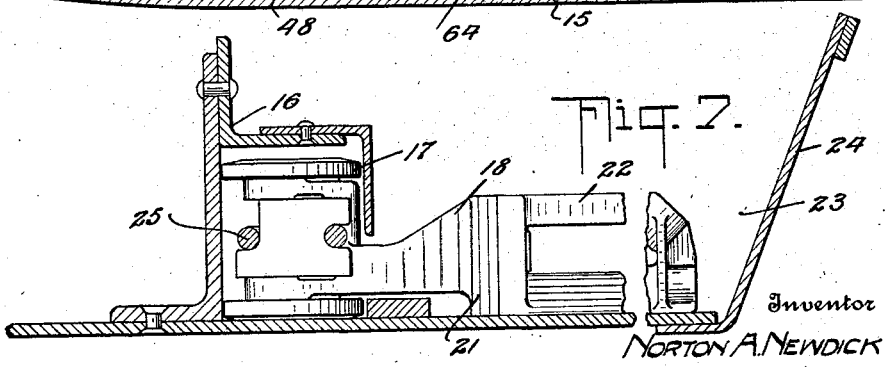

1,762,071

UNITED STATES PATENT OFFICE

NORTON A. NEWDICK, OF COLUMBUS, OHIO, ASSIGNOR TO THE COLODER COMPANY, OF COLUMBUS, OHIO, A CORPORATION OF DELAWARE

LOADING MACHINE

Refiled for abandoned application Serial No. 619,582, filed February 17, 1923. This application filed February 5, 1929. Serial No. 337,717.

This invention relates to improvements in loading machines, and is especially directed to loading machines of the type adapted particularly for use in connection with the loading of minerals in underground mines, and in accordance with the invention there is provided a loading machine which includes an inclined gathering conveyor, having its upper end pivotally supported so that the forward or lower end of the conveyor will have a sweep movement across the floor of a mine, the said conveyor being formed to include a belt which has its going and return runs disposed at similar elevations, and which includes laterally projecting flights arranged for travel through a plurality of longitudinally extending run-ways formed in connection with the conveyor, sprocket means being formed at the ends of said belt to maintain the latter under proper tension and to effect the driving thereof, the arrangement of parts being such that in operating the conveyor will swing horizontally from the pivotal mounting at the rear or upper end thereof, and the forward or nose end of the machine will be brought into engagement with the loose or semi-solid materials to be gathered, enabling the flights carried by the belt of the conveyor to sweep into engagement with the materials, draw the same upon the conveyor and advance the same rearwardly through either of the run-ways in the line of draft of the machine, and finally discharging the materials from the upper or rear end of the machine into suitable conveying means employed for removing the materials from the mine.

Among the objects of the invention are: first, the provision of an improved mounting for effecting the support of the adjustable nose sprocket provided upon the forward depressed end of the gathering conveyor frame, wherein said sprocket is mounted in a longitudinally adjustable carrier mounted in connection with the conveyor frame, whereby upon the adjustment of the carrier the sprocket may be positioned to place a proper degree of tension upon the link conveyor belt of the machine. Second, in constructing the said adjustable sprocket to embody features of design which enable the same to properly operate with the peculiar form of conveyor belt employed, and to render the machine exceptionally staunch and durable at the forward end thereof. Third, in the provision of stripping plates formed with the carrier and conveyor frame for insuring the disengagement of the links of the conveyor belt with the teeth of the nose sprocket, whereby the belt will be cast about the sprocket at proper positions in the operation of the machine. Fourth, in the provision of means whereby the longitudinally adjustable carrier of the nose sprocket will be adapted to the configuration of the conveyor frame, which embodies a downwardly inclined portion terminating at its front end in a depressed or flat extremity which lies substantially parallel to the floor. Fifth, in the provision of means for maintaining the forward or nose end of the machine under the material to be loaded, which means embodies a substantially U shaped reinforcing strip arranged to surround the periphery of the forward lower end of the frame, and which strip is formed to include laterally extending wings projecting in front of the lower ends of the runways through which material is advanced in passing through the conveyor, and in constructing the lower end of the frame so that while the same is exceptionally strong by reason of the reinforced edges thereof, the same will serve to operate successfully and efficiently on floors of friable condition, an improved construction being provided for preventing the nose end of the machine from digging into such floors and interfering with the side swinging movements thereof.

This application is filed in lieu of my abandoned application Serial No. 619,582, filed February 17, 1923.

With these and other objects in view, as will appear as the description proceeds, the invention consists in the novel features of construction, combinations of elements and arrangement of parts, hereinafter fully described and pointed out in the appended claims.

In the accompanying drawings, forming a part of this specification, in which similar characters of reference denote like and corresponding parts throughout the several views thereof:

Figure 1 is a top plan view of a loading machine constructed in accordance with the present invention, Figure 2 is a side elevation thereof, Figure 3 is a plan view disclosing on an enlarged scale the construction of the front end of the gathering conveyor, the cover plate being removed to more fully disclose the underlying structure, Figure 4 is a vertical sectional view taken on the plane indicated by the line 4—4 of Figure 3, Figure 5 is a transverse sectional view taken on the line 5—5 of Figure 4, Figure 6 is a side elevation of the nose sprocket carrier, and disclosing more particularly the belt stripping means, Figure 7 is a transverse sectional view taken through the conveyor frame, the gathering conveyor belt and the guides therefor.

Referring more particularly to the details of the invention there is disclosed in Figures 1 and 2, particularly, a loading machine of the type set forth in my prior Patent 1,715,469, granted June 4, 1929, and includes a supporting base or truck 1, which is adapted to travel upon a suitable frame or trackway 2. Mounted upon the truck is a horizontally swinging table 3, which is pivoted as at 4 in connection with the truck and arranged to swing horizontally thereover, the rear end of the table being supported for free swinging movement upon rollers or other suitable anti-friction support 5. The forward end of the table is provided with brackets 6, which support for swinging movement in a vertical plane a journal 7, which is in the form of a yoke and terminates in an upstanding vertical pivot 9, upon which is mounted for swinging movement the rear or upper end of the gathering conveyor 10 of the machine. By the provision of the journal 7 it will be understood that the gathering conveyor is capable of swinging horizontally about the vertical pivot 9 and also of swinging vertically about the pivotal connection provided between the journal 7 and the brackets 6.

The gathering conveyor is constructed to embody an elongated inclined frame 11 preferably formed from sheet metal plate and suitably reinforced by structural iron ribs 12. The frame, as shown in Figures 1 and 2, includes a downwardly inclined intermediate portion 13, a substantially elevated and horizontally extending rear or discharge portion 14, which seats upon and is swiveled to the journal 7, while the lower end of the frame terminates in a flat, depressed forwardly extending nose extremity 15, arranged when the machine is in active operation, to rest upon the floor of a mine so as to penetrate and pass under a body of material to be loaded when the frame is swung horizontally, or forced forwardly into and under said materials.

Suitably mounted upon the upper surface of the frame 11 and extending longitudinally thereof throughout its central portion, is a pair of chain or belt guides 16, which are adapted to receive the endless conveyor belt 17 of the machine. This belt is of the link variety and is flexible in both horizontal and vertical planes so that it will be adapted to the curvature of the frame 11. In this instance the belt is formed to comprise a plurality of suitably placed flight carriers 18, which are provided at their ends with vertical axles 19 arranged for the reception of rollers 20, which facilitate the movement of the belt through the guides 16 and serve to minimize friction losses. These carriers are formed with outwardly projecting portions 21, to which are bolted or otherwise secured laterally extending flights 22, arranged to move in unison with the belt and to be advanced through a pair of spaced run-ways 23, extending longitudinally through the frame on opposite sides thereof and located between the guides 16 and the sides 24 of the frame 11. To flexibly unite the carriers 18, there are provided links 25 and 26, having grooved wear blocks 27 placed therebetween.

To drive the belt an operating motor 28 is mounted upon the table 3 and by suitable gearing power is imparted from the motor 28 to a drive shaft 29 extending through the journal 7, and the upper end of the shaft 29 is connected with a drive sprocket 30, arranged at the upper end 14 of the frame and which is of such form that the teeth thereof will be positioned to mesh with the openings provided in the links 26 and recesses 31 formed in the flight carriers 18. It will be understood that the links 26 are properly spaced with respect to the carriers 18 to preserve the pitch of the chain and to enable the latter to properly engage and be driven by the sprocket 30.

The forward or lower end of the gathering conveyor includes an adjustable nose sprocket 32, similar generally to the sprocket 30 and serves in the capacity of an idler, the said sprocket being adjustable to take up any looseness which may from time to time occur in the belt, and the said sprocket 32 is located so that as the belt moves thereabout the flights 22 will be brought into sweeping engagement with the coal or other materials to be loaded, which flights will travel in an arcuate or substantially horizontal path and project into engagement with said materials, so that upon movement of the chain the materials engaged by the flights will be advanced through either of the alternately available run-ways 23.

To support the nose sprocket there is provided a sprocket carrier or cage 33, which in this instance is in the form of a casting and includes a forwardly disposed clevis extremity 34 between the arms of which the nose sprocket is rotatably mounted. The outer end of the extremity 34 is formed with registering openings through which passes a bushing 34, which bushing is bored for the reception of a bolt 36, having the lower threaded end thereof positioned within a sliding block 37, arranged for longitudinal movement within an elongated slot 38 formed longitudinally in the lower end 15 of the frame 11. The edges of the block 37 project laterally beyond the slot 38 so that when the nut 39 provided upon the threaded end of the bolt 36 is tightened, frictional pressure will be brought to bear upon the forward end of the carrier 33 to retain the latter in set positions of adjustment.

Surrounding the bushing 35 and positioned between the wear plates 40 is a roller bearing 41, which is received within the vertical bore 42 of the sprocket 32, and enables said sprocket when rotated by the action of the belt to revolve freely and with but a minimum of friction. It will be noted particularly by reference to Figures 3 and 4, that the sprocket is formed with an upstanding circular flange 43, which is engaged with the upper of the rollers 20 provided upon the carriers 18. It will be understood that when the conveyor is in operation, the forcing of the machine into and upon a coal pile or the like places a very considerable strain upon the flights, which in turn react upon the sprocket 32. Thus, the flange 43 serves to guide the flights and to receive the inward thrust thereof under conditions of actual service.

The sprocket 32 and the belt at the forward end of the machine are protected by means of a cover plate 44, which is suitably secured as at 45 to the carrier 33, the said plate 44 serving to house the nose sprocket and to protect the same from the falling materials which are gathered by the machine. The cover plate 44 also serves in the capacity of a platform upon which an operator may stand under certain conditions in the operation of a machine, to release wedged materials and to pick the same down into the path of the moving flights.

To adjust the carrier and the nose sprocket 32 longitudinally, the said carrier is formed with a horizontally extending shelf 46 and upwardly extending sides 47, the shelf 46 being located in a plane above the lower arm of the clevis 34 so that the carrier will be adapted to the angle existing in the frame 11 between the nose extremity 15 and the inclined intermediate portion 13. Placed beneath this shelf is a pair of wedges 48, the lower surfaces thereof being shaped to conform to the curvature of the frame and the upper surfaces to the shape of the shelf 46. Similarly, wedges 49 are provided between the sides 47 of the shelf and the forwardly converging guides 16. The wedges 48 and 49 are of prime importance in properly placing the carrier 33 upon the machine for active operation and to permit of the longitudinal adjustment thereof. It will be seen that the said wedges present smooth plane perpendicular surfaces, corresponding to the surfaces of the shelf 46 and 47, and which provides a pocket into which the shelf of the carrier may be placed with freedom for sliding movement.

It will be understood that the guides 16 are composed of angle irons, and the frame 11 of sheet metal, and owing to this construction, very considerable practical difficulty would be encountered if an attempt were made to fit the carrier 33 directly upon the bottom of the frame and between the guides 16. However, by the use of the wedges 48 and 49 the carrier may be accurately fitted to the machine with but a minimum of difficulty. Clamping bolts and nuts 50 are used to secure the shelf 46 and the sides 47 thereof to the bottom of the frame 11 and to the guides 16, the said bolts 50 extending through elongated slots 51 formed in said shelf and sides 47, to permit of the necessary longitudinal adjustment of the carrier as a whole and to stabilize the same for operation.

To further anchor the carrier 33 in position the king bolt housing 52 of the frame, in which a king bolt 53 is mounted and employed to connect a pony truck 54 to the under part of the forward end of the machine when the latter is being transported is provided, with ears 55 which pivotally receive one end of a forwardly longitudinally extending screw 56, which receives an enlarged nut 57, grooved as at 58 and arranged to be positioned within a notch 59 formed in a web 60, arising from the shelf 46. By the inclusion of the nut 57 an adjustable anchor is provided for retaining the carrier in set positions of adjustment.

As shown in Figure 6, the sides of the carrier 33 include longitudinally extending stripping bars 61, as shown in Figure 3. These bars are positioned so that the forward beveled ends thereof terminate immediately adjacent to the flange 43, so that as the sprocket rotates, the rollers 20 will engage with said bars 61 and by their presence the links of the belt will be forced out of engagement with the teeth of the sprocket, overcoming undue wear on the links of the belt and producing a smooth and freely operating sprocket construction. The lower arm of the clevis 34 is also formed with a pair of stripping bars 62, which are recessed along their lower edges as at 63 for the reception of stripping bars 64 carried permanently by the nose extremity 15. This construction adapts the strippers to the adjustment of the carrier 33.

Another important feature of the invention resides in reinforcing the outer edges of the sheet metal plate constituting the nose extremity of the frame by means of a U shaped casting 65, formed in one or more sections. This casting has the upper surface thereof recessed as at 66 to receive the outer periphery of the nose extremity 15 and is riveted thereto as at 67. The casting further includes an outwardly and downwardly inclined portion 68 which provides an elongated beveled surface 69, so disposed that as the gathering conveyor swings bodily horizontally the materials under which the nose end of the machine passes press downwardly upon said inclined or beveled surface 69 and thereby maintain the nose end of the machine in engagement with the floor and under the materials to be gathered, preventing climbing of the machine or the undue raising thereof from the floor. The casting 65 terminates rearwardly in a pair of laterally extending wings 70, which are arranged to project across the front edges of the entrances to the run-ways 23, reinforcing the edges of said run-ways and serving to direct material toward or into the run-ways.

In the event that the floor over which the machine operates is in a particularly poor condition, that is, when the slate crumbles or disintegrates readily, I cover the bottom of the extremity 15 with a plate 71 upon which the weight of the forward end of the gathering conveyor rests. This plate produces a relatively wide area over which the weight of the nose end is distributed, and enables the machine to readily slide over the floor, as it could not do if the weight were to be concentrated upon the outer edges of the casting 65.

In summary, it will be observed that the present invention provides a loading machine of the character set forth with an improved adjustable means for mounting the nose sprocket thereof and wherein the nose sprocket itself is of such construction as to efficiently co-operate with the links of the gathering belt to insure the proper flexing and turning of the relatively heavy links of the belt around the sprocket, with but a minimum of friction, wear, or other power losses. Moreover, by the formation of the casting 65 with its elongated bevel surfaces and the laterally extending wings 70 with their bevel surfaces a structure is produced which will positively maintain itself beneath the material to be loaded without digging into or disturbing the condition of the floor and at the same time permitting the employment of the plate 71 to admit of the free lateral swinging of the gathering conveyor. The plate 71 receives the wear on the conveyor incident to its lateral movement, and may be readily renewed from time to time.

After the coal has been gathered and advanced through either one or the other of the run-ways 23, the same is discharged into a hopper 72 formed with the forward end of a delivery conveyor 73, the frame 74 of which being mounted upon the table 3 to swing in unison therewith. The conveyor 73 includes longitudinally extending chains 75 united by transverse flights 76, which operate over the bottom of the frame and serve to advance material out of the hopper and through the longitudinally extended elevated rear end 77 of the frame 74. The chains 75 pass around drive sprockets 78 mounted at the rear end of the frame 74 and beneath which a portable mine car may be placed for receiving materials discharged from the machine. By the use of cars of this type loaded coal may be quickly transported out of the mine to a suitable point of discharge.

The cover plate 44 is provided with a downwardly extending flange 85 provided on the inside thereof, with a strip 86. This strip is so disposed that it constitutes in effect a continuation of the chain guides 16 so that the rollers 20 will be guided along their outer edges during their travel around the foot sprocket 32, relieving the flange 43 of said sprocket of considerable wear and strain and serves to produce a chain structure characterized by its smooth and free operation.

What is claimed is:

1. In a loading machine, a gathering conveyor comprising a downwardly inclined frame terminating at its lower end in a depressed nose extension, a conveyor belt mounted upon said frame, a sprocket arranged upon said extension and around which said belt is trained, a carrier for said sprocket, means for adjusting said carrier longitudinally of said extension, and stripping means formed with said carrier and co-operative with said sprocket for freeing the teeth of the latter from engagement with said belt.

2. In a loading machine, a gathering conveyor comprising a downwardly inclined frame terminating in a flat depressed nose extremity, a conveyor belt mounted upon said frame, a sprocket situated upon said nose extremity and around which said belt is trained, a carrier for said sprocket adjustably mounted upon said nose extremity and strippers mounted adjacent to said carrier for positively effecting the release of said belt from the teeth of said sprocket.

3. In a loading machine, a gathering conveyor constituting an elongated downwardly inclined frame terminating at its forward end in a depressed nose extremity, a conveyor belt carried by said frame, longitudinally extending forwardly converging guides for said belt, a sprocket mounted upon said nose extremity and around which said belt is trained, a carrier for said sprocket suitably mounted upon said frame, and wedge means interposed between said carrier and said guides and between said carrier and the bottom of said frame.

In testimony whereof I affix my signature.

NORTON A. NEWDICK.